United States Patent [19]

Platt et al.

[11] 4,067,012
[45] Jan. 3, 1978

[54] TRACKING FEEDBACK CLUTTER MAPPER CONTROL DEVICE

[75] Inventors: Vernon H. Platt, Fullerton; Richard D. Wilmot, Buena Park, both of Calif.

[73] Assignee: Hughes Aircraft Company, Culver City, Calif.

[21] Appl. No.: 717,712

[22] Filed: Aug. 25, 1976

[51] Int. Cl.² ............................................... G01S 7/46
[52] U.S. Cl. ...................................................... 343/7 A
[58] Field of Search ........................................ 343/7 A

[56] References Cited
U.S. PATENT DOCUMENTS 3,487,405 12/1969 Molho et al. ..................... 343/7 A 3,680,095 7/1972 Evans ................................. 343/7 A
3,995,270 11/1976 Perry et al. ......................... 343/7 A

*Primary Examiner*—T.H. Tubbesing
*Attorney, Agent, or Firm*—Martin E. Gerry; W. H. MacAllister

[57] ABSTRACT

An antenna is connected to a surveillance sensor feeding a target detector. The target detector provides multiple inputs of target reports, azimuth, range and scan count data to a clutter mapper circuit which in turn feeds a track-while-scan circuit one output of which is fed back to a data input buffer also feeding the clutter mapper circuit. Another output of the track-while-scan circuit provides input to a CRT display.

15 Claims, 5 Drawing Figures

TRACKING FEEDBACK CLUTTER MAPPER CONTROL DEVICE

CROSS REFERENCE TO RELATED APPLICATION

An application entitled Clutter Mapper Logic System, by the same inventive entity, has been filed concurrently with this Application, Ser. No. 717,711, filed Aug. 25, 1976.

BACKGROUND OF THE INVENTION

This invention is in the field of target detecting sensors, and more particularly in the area of target detection in presence of clutter.

The prior art which was used to reject stationary clutter was the automatic clutter mapper. This automatic clutter mapper, which has been implemented in radar systems, gave good clutter rejection performance for stationary clutter which was consistently detected in a given automatic clutter mapper segment. Clutter was detected by incrementing an up-down counter by four with a detection, by one with a miss, until a sufficiently large number of detections had been counted that the probability was very low that they could have occurred due to a moving target. At the time clutter was indicated, the clutter amplitude was measured and a threshold was set to reject the clutter. Although this device worked well for rejecting clutter in a normal radar propagation environment, it allowed more than the allowable clutter false alarm rate in a severe ducting environment because with ducting the clutter did not occur consistently in the same automatic clutter mapper segment. Ducting is the condition when radar propagation is not straight line but trapped by unusual atmospheric conditions.

SUMMARY OF THE INVENTION

The purpose of this invention is to provide improved clutter rejection of scintillating, fading clutter with scan to scan motion caused by anomalous radar propagation conditions due to ducting while at the same time not rejecting valid targets. This invention with the Tracking Feedback Clutter Mapper Control Device reduced the clutter false alarm rate in a ducting environment while still detecting valid targets.

The present invention allows the Tracking Feedback Clutter Mapper Control Device (hereinafter referred to as TFCMCD) to be used to reject clutter with a low blip to scan ratio due to position scintillation or amplitude fluctuation and fading without rejecting valid targets. If the tracking feedback clutter control circuit were not used, valid targets could be erroneously rejected in an environment of high target density.

The use of the tracking feedback control circuit allows the automatic clutter mapper to use lower clutter rejection threshold levels and thus improve performance.

DETAILED DESCRIPTION

Figure 1:
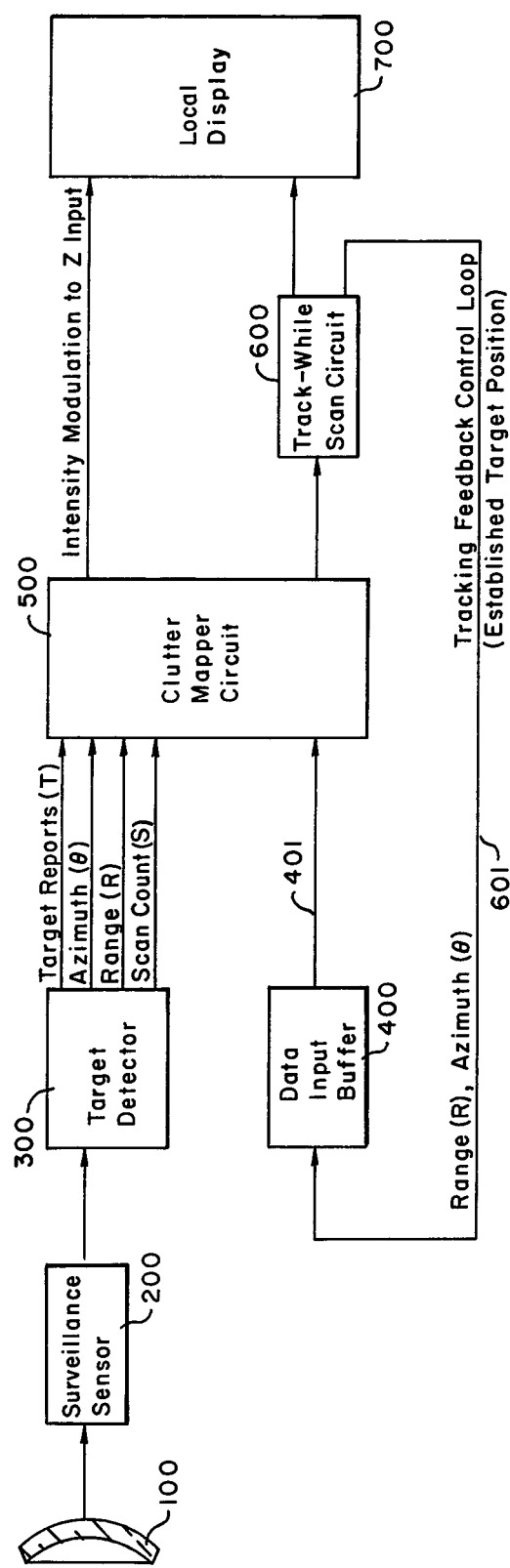
FIG. 1 is a system schematic of the tracking feedback clutter mapper control device.

Referring to FIG. 1, a block diagram of the inventive system is shown schematically in simplified format. This system is suitable for sensing electromagnetic or sound signals including those at radar frequencies, at frequencies below the radar band, those in the optical or infrared range, and in the sonar range.

A receiving antenna is shown at 100, the output of which is connected to the input of surveillance sensor subsystem 200. The output of sensor 200 feeds target detector 300 which provides in exemplary fashion four outputs such as target report data output, azimuth data output, range count output and scan count output.

All these outputs are provided as an input to clutter mapper circuit 500 in conjunction with data input buffer circuit 400 feeding clutter mapper circuit 500 by means of connection 401. Clutter mapper circuit 500 feeds track while-scan circuit 600. The track-while-scan circuit 600 has an output at 601 which is a feedback loop containing range and azimuth data, processed through the track-while-scan circuit, and returned as an output to data buffer 400.

The output of track-while-scan circuit 600 comprises an output to feed a local cathode ray display 700 and has the corrective output which is the feedback of range and azimuth data used as input into the data buffer circuit 400. Another output from clutter mappr circuit 500 is provided as an input to intensity or Z axis of cathode ray display 700 to intensity modulate same.

Figure 2:
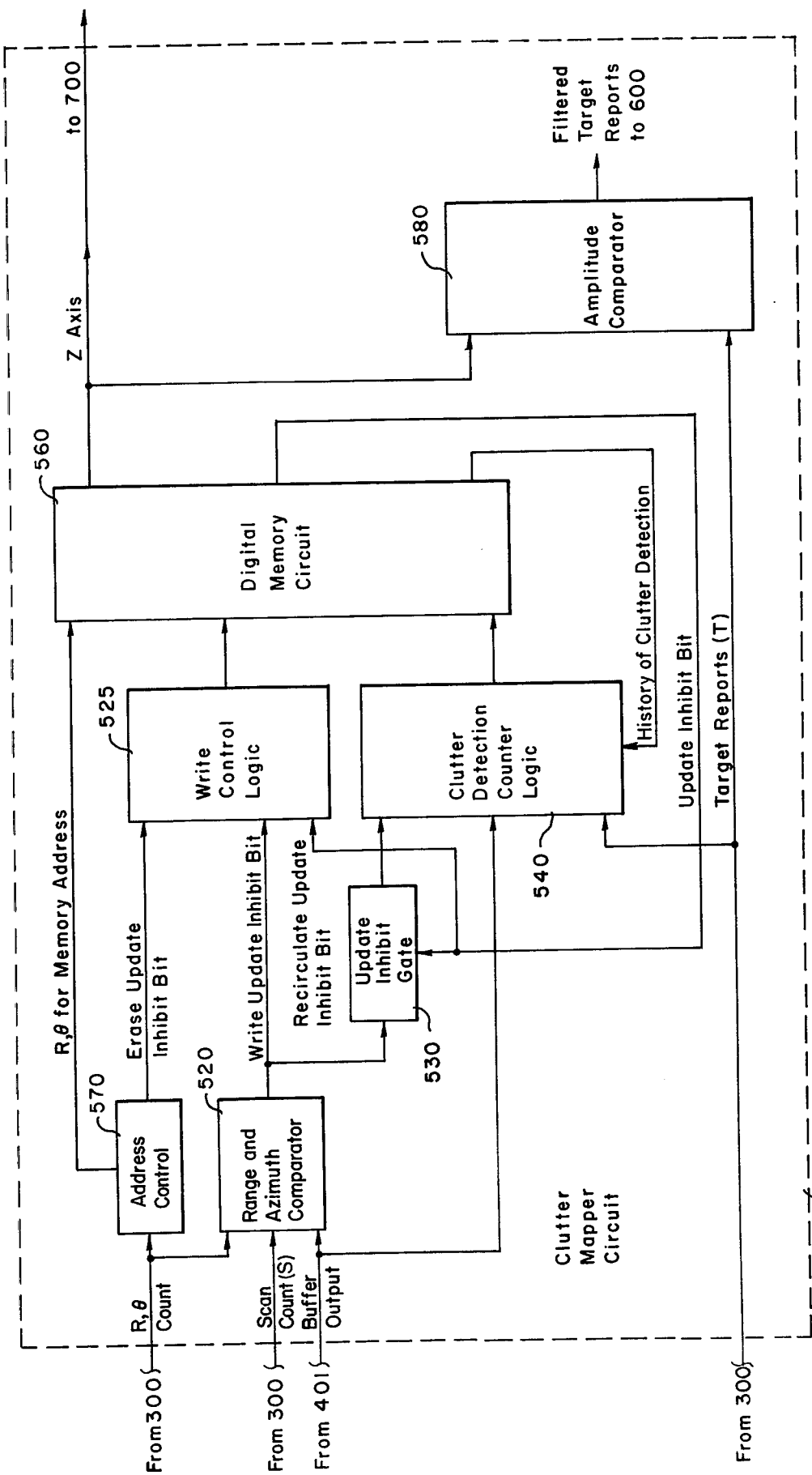
FIG. 2 is a detailed block diagram schematic comprising the clutter mapper circuit within FIG. 1.

As seen from FIGS. 1 and 2, the basic function of the tracking feedback control loop (601-401) is to prevent automatic clutter mapper 500 from responding to valid targets and rejecting them as clutter. It does this by inhibiting the update function of automatic clutter mapper 500 in those automatic clutter mapper segments in which valid targets are being tracked.

The range (R) and azimuth ($\theta$) of targets being automatically tracked are received from the tracking circuit 600 via a data link buffer or a direct connection with the computer, depending upon whether the radar system is located at a remote site or is co-located with the tracking circuit.

The tracking feedback control circuit first processes the data in a data input buffer 400 to synchronize, format, and provide temporary storage of the data until a complete message is received. The range and azimuth data is transferred to a range/azimuth comparator 520. When a comparison is made, it indicates that the appropriate automatic clutter mapper segment containing the track is now available in the automatic clutter mapper memory 560.

At this time, an update inhibit bit is written in the automatic clutter mapper memory 560 and is recirculated as long as the automatic clutter mapper segment is current; the bit is erased at the last range bin of the last sweep of the automatic clutter mapper cell, so the bit is not recirculated from scan-to-scan but is rewritten as required for each scan. This allows the bit to always represent the latest position of the track.

The update inhibit bit is read out of the automatic clutter mapper memory 560 and when it is true, it is used to inhibit updating the clutter detection counter logic 540 for that particular automatic clutter mapper segment. When the clutter counter is not incremented even though a target report is received, the clutter detection threshold level cannot be achieved and clutter will not be indicated for any automatic clutter mapper segment with a valid target track in it. After the track leaves the automatic clutter mapper segment, the inhibit function is disabled because the the update inhibit bit is erased and the clutter detection logic is allowed to increment and detect clutter. In this way a sensitive clutter threshold level can be used with the clutter counter logic 540 for obtaining good clutter rejection performance without appreciably degrading the detection of valid targets.

Details of clutter mapper circuit 500 are described in connection with FIG. 2.

The range and azimuth count data from target detector 300 are used as an input to an address control circuit 570. The output of address control circuit 570 provides an input to digital memory circuit 560. Another input comprising the scan count outputted from target detector 300 is provided to range and azimuth comparator 520. Clutter detection counter logic 540 is fed by buffer output 400 at 401. Target report data as provided from target detector 300 is also used as input to 540. Range azimuth comparator 520 provides a write update inhibit signal as an input to write control logic 525 and to inhibit gate 530. Other inputs to 525 are the recirculate update inhibit bit from memory 560 and the erase update inhibit bit signal from 500. The output of 525 writes the update inhibit bit when the range azimuth comparison of the targe report and the clutter mapper segment occurs, recirculates the bit until the last range bin of the last azimuth sweep of the segment at which time the update inhibit bit is erased.

The output of inhibit gate 530 feeds the clutter detection counter logic circuit 540, whichin turn feeds digital memory circuit 560. Also feeding circuit 540 as well as amplitude comparator 580 is a target report input (T) from circuit 300. An input to 520 from target detector 300 provides (R) and (θ) counts from 300. Memory 560 provides a feedback loop consisting of the history of the clutter detection information back into clutter detection counter logic 540 as an update of information therein. Likewise, the output of digital memory circuit 560 feeds an update inhibit bit as an input to inhibit gate 530 for similar corrections. When gate 530 output is TRUE, a valid target is in the clutter mapper segment and the segment clutter counter is inhibited from incrementing. One output of digital memory circuit 560, containing clutter amplitude data, provides an input to amplitude comparator 580. This comparator compares clutter amplitude with the target report amplitude fed from target detector 300. The clutter amplitude output of digital memory circuit 560 provides the requisite Z axis intensity modulation signal to the intensity control circuit of cathode ray display 700. Finally, the output of amplitude comparator 580 provides the filtered target reports as an input to the track-while-scan circuit 600 as referred to above.

Antenna 100 is shown in the textbook entitled, Introduction to Radar Systems, by Skolnik, at page 15, McGraw-Hill Book Company, New York, 1962 issue.

Sensor 200, a surveillance radar, is also shown in same textbook in chapter 8, pages 356–407.

Track-while-scan circuit 600 is illustrated and described in U.S. Pat. No. 3,603,994.

Although a cathode ray display at 700 may utilize a conventional oscilloscope such as a 10 mc Textronix scope, this display is also shown and discussed in the above-mentioned Skolnik textbook at pages 391-.

Address control circuit 570, which is part of clutter mapper circuit 500, is shown and described in FIG. 2 of U.S. Pat. No. 3,940,762 as memory address timing control logic 26.

Range and azimuth comparator 520, which is part of clutter mapper 500, is shown in U.S. Pat. No. 3,325,806, FIG. 1 thereof as component 14.

The erase update inhibit bit signal is generated as shown in U.S. Pat. No. 3,325,806, signal Z in FIG. 4b of sad patent.

Clutter detection logic 540, which is part of clutter mapper 500 is shown in U.S. Pat. No. 3,940,762 in FIG. 2, computer 28 and 30 which is expanded in FIGS. 4, 5, 6 and 7 thereof and accompanying description.

Digital memory circuit 560, which is part of clutter mapper circuit 500, is shown and described in FIG. 2 of U.S. Pat. No. 3,940,762 as memory 24 and memory decoder 26.

Amplitude comparator 580 is so old in the art that references thereto are unnecessary.

Figure 3A:
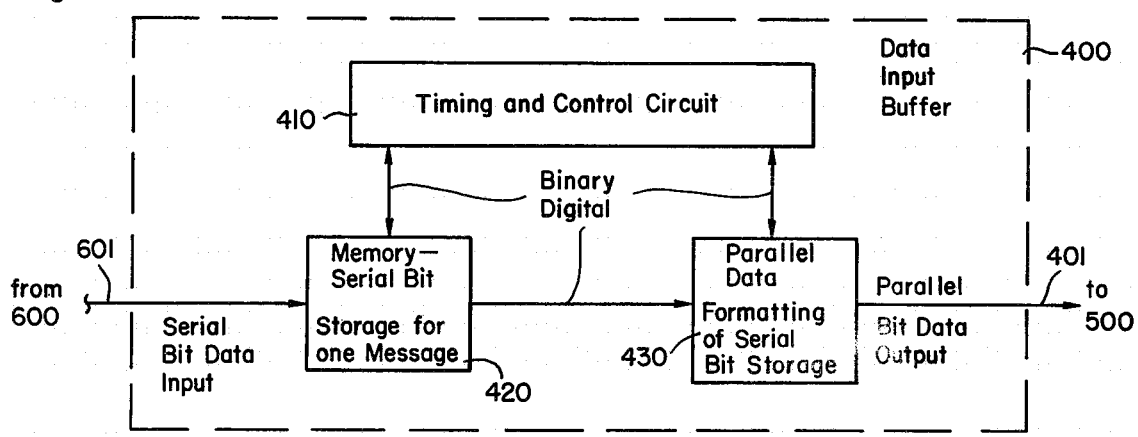
FIG. 3a shows in schematic form of the data input buffer as part of the system of FIG. 1.
Figure 3B:
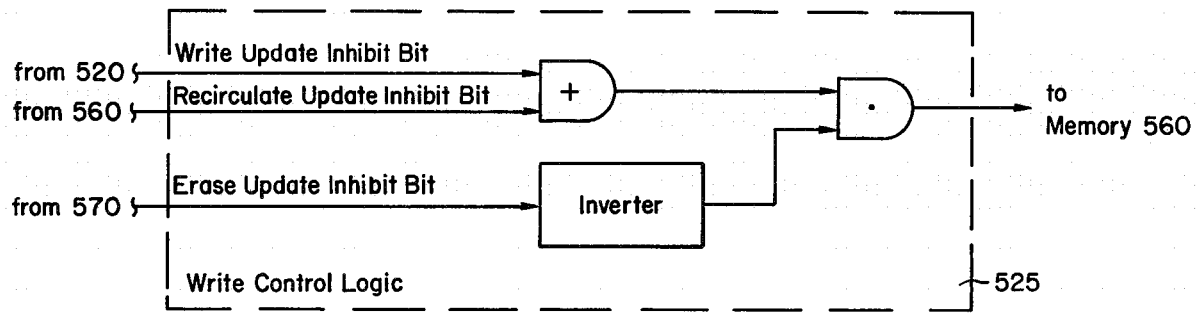
FIG. 3b shows details of the write control logic shown in FIG. 2.

However, write control logic 525, part of clutter mapper 500, is shown herein as FIG. 3b and separately described, through its components are old.

Referring also to FIG. 3a for details of circuit 400, and FIG. 3b for details of circuit 525, data input buffer 400 has its input of range (R) and azimuth (θ) utilized as a tracking feedback control loop of established target position from track-while-scan-circuit 600 and as an input to the buffer at 601. Buffer output is provided at 401 as an input to clutter mapper circuit 500.

This buffer uses conventional elements of timing and control circuit 410 providing cross-communication between circuit 410 and serial bit storage memory 420 the output of which also feeding parallel data formatting circuit 430, circuit 410 also interconnected with circuit 430, to transform the serial bits to parallel bit data and provide a parallel bid data output therefrom as input to mapper circuit 500.

This buffer is conventional in the art and details thereof are not needed to be illustrated herein. The circuit is merely a serial bit to parallel bit converter and timing source 410 is needed for synchronization and enabling the serial bits to be stored as parallel bit information The components of 525 as shown in FIG. 3b illustrates that the update inhibit bit write control logic is set true when the erase inhibit bit signal is false and either the write or recirculate inhibit bit signals are true; otherwise the update inhibit bit write control signal to memory 560 is set false.

Figure 4:
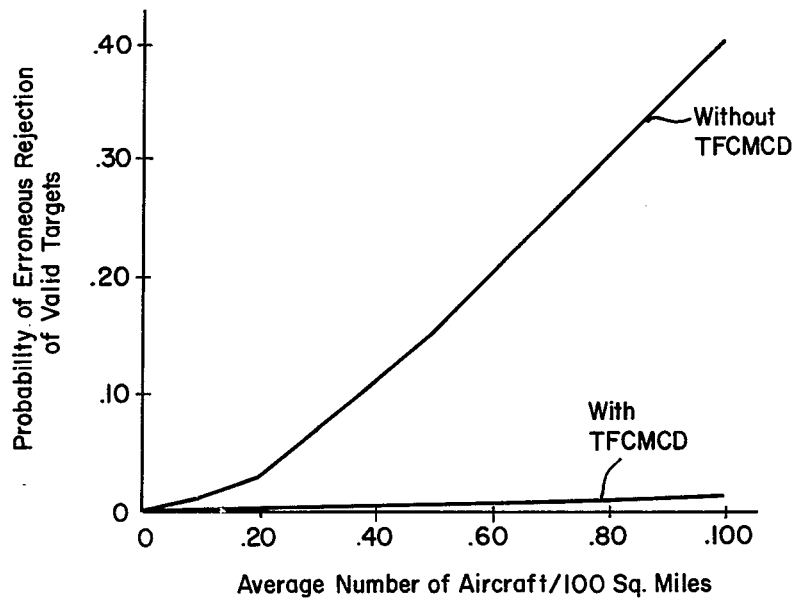
FIG. 4 is a graph showing probability of rejecting valid targets with and without the tracking feedback clutter mapper control device.

Referring also to FIG. 4, as well as the prior figures hereinabove discussed, the curve showing the probability of rejecting valid targets with the use of the inventive system is graphically illustrated.

The TFCMCD requires only two detection events separated by the proper time interval to identify clutter, thus enabling better performance than prior art automatic clutter mappers with scintillating clutter due to ducting. The TFCMCD detects clutter by counting the elapsed time between detections instead of the number of detections. This allows clutter to be identified with only two detections versus a typical value of eight to twelve detections for prior art automatic clutter mappers. Thus the TFCMCD is much more effective in rejecting clutter with a low blip-to-scan ratio, due to position scintillation or amplitude fluctuation and fading, without rejecting valid targets. If the instant device were not used, valid targets would be erroneously rejected in an environment of high target density. Thus lower clutter rejection threshold levels can be used to improve performance.

Therefore, without this device, more rejections per scan of clutter targets of the surveillance sensor are obtained due to indication of apparent targets, as compared with less rejections per scan with the device since the system without the device is not able to distinguish clutter from actual targets.

Since only two detections are required to identify clutter, there is a significant probability that in a high target density environment, two detections separated by several minutes can occur due to presence of valid targets.

For randomly spaced targets, the probability of occurrence of a valid target in an automatic clutter mapper segment can be estimated by using the Poisson probability density function which gives the probability of occurrence of a low probability event in a small interval:

$$f(x) = (m^x e^{-m}/x!), m \cancel{J} 0, x = 0, 1, 2 \ldots$$

where $m$ is the mean (average) value of the probability of the event and $x$ is the number of times that the event occurs in the interval. The probability of no occurrences in the interval (no detections in the automatic clutter mapper segment) is when $x = 0$; this is:

$$P(x = 0) = (m^0 e^{-m}/0!) = e^{-m}.$$

The probability of at least one occurrence in the interval (at least one detection in the automatic clutter mapper segment) is given by the expression:

$$P(x < 0) = 1 - P(x = 0) = 1 - e^{-m}.$$

The independent variable $m$ is the average number of targets per 100 square miles. The automatic clutter mapper segment is assumed to be four miles by four miles for sixteen square miles.

The probability of two detections separated by a time interval long enough to assure statistical independence in an automatic clutter mapper segment is given by $[P(x > 0)]^2$ which is graphed in FIG. 4. This shows that with an average of one target/100 square miles, 40% of the valid targets are rejected which is clearly not acceptable.

The probability that the TFCMCD logic automatic clutter mapper will erroneously reject a valid target when the tracking feedback control circuit is used can be estimated by assuming that 90% of the valid targets in the radar's surveillance region are being tracked automatically and that these targets do not cause the TFCMCD automatic clutter mapper clutter counter to increment and count up to the clutter threshold. Thus the average number of aircraft that can affect the TFCMCD automatic clutter mapper clutter counter is reduced by the tracking feedback control circuit to one/tenth of its value without the tracking feedback control circuit. This reduction causes a sharp decrease in the number of valid targets erroneously rejected by the TFCMCD automatic clutter mapper. FIG. 4 shows a comparison of valid targets rejected by the TFCMCD automatic clutter mapper with and without the tracking feedback control circuit device. Without the tracking feedback control circuit device, 40% are rejected with one target per 100 square miles, 15% are rejected with one target per 200 square miles, and 8% are rejected with one target per 300 square miles. With the tracking feedback control circuit device, 1% are rejected with one target per 100 square miles, ¼% are rejected with one target per 200 square miles, and 1/10% are rejected with one target per 300 square miles. Thus, it is obvious that the TFCMCD automatic clutter mapper cannot be effectively used in a high density target environment unless the tracking feedback control circuit device is also used.

What is claimed is:

1. In an energy sensing system, the combination comprising:
   a range-azimuth comparator;
   an inhibit gate electrically connected to the range-azimuth comparator;
   a digital memory circuit electrically connected to the range-azimuth comparator;
   a clutter detection counter logic circuit, the output of which is electrically connected to the input of the memory, the output of the inhibit gate being electrically connected to the input of the clutter detection counter logic circuit.

2. The invention as stated in claim 1, wherein the output of the memory is electrically connected to the input of the inhibit gate.

3. The invention as stated in claim 1, where the output of the memory is electrically connected to the input of the clutter detection counter logic circuit.

4. The invention as stated in claim 1, including an amplitude comparator circuit electrically connected to the memory.

5. The invention as stated in claim 4, including a track-while-scan circuit electrically connected to the output of the amplitude comparator circuit.

6. The invention as stated in claim 5, including a buffer circuit electrically connected to the output of the track-while-scan circuit.

7. The invention as stated in claim 5, including a cathode ray display electrically connected to the track-while-scan circuit and the digital memory circuit.

8. The invention as stated in claim 4, including a target detector electrically connected to the amplitude comparator circuit.

9. The invention as stated in claim 1, including a range-azimuth count circuit electrically connected to the input of the range-azimuth comparator.

10. The invention as stated in claim 1, including an address control circuit electrically connected to the input of the memory circuit.

11. The invention as stated in claim 10, including a target detector electrically connected to the address control circuit.

12. The invention as stated in claim 11, including a surveillance sensor electrically connected to the input of the target detector.

13. The invention as stated in claim 1, including a buffer circuit electrically connected to the input of the range-azimuth comparator.

14. The invention as stated in claim 1, including a target detector, the output of which is electrically connected to the input of the inhibit gate.

15. The invention as stated in claim 14, including a surveillance sensor electrically connected to the input of the target detector.

* * * * *